(12) United States Patent
Guillou

(10) Patent No.: US 12,345,091 B2
(45) Date of Patent: Jul. 1, 2025

(54) ANTI-FLOOD DEVICE

(71) Applicant: FlowStop Industrie SAS, Perpignan (FR)

(72) Inventor: Olivier Guillou, Montauban (FR)

(73) Assignee: FLOWSTOP SAS, Montauban (FR)

( * ) Notice: Subject to any disclaimer, the term of this patent is extended or adjusted under 35 U.S.C. 154(b) by 258 days.

(21) Appl. No.: 18/028,894

(22) PCT Filed: Mar. 4, 2021

(86) PCT No.: PCT/EP2021/055485
§ 371 (c)(1),
(2) Date: Mar. 28, 2023

(87) PCT Pub. No.: WO2021/176002
PCT Pub. Date: Sep. 10, 2021

(65) Prior Publication Data
US 2023/0279723 A1    Sep. 7, 2023

(30) Foreign Application Priority Data

Mar. 5, 2020 (FR) ..................... 20/02225

(51) Int. Cl.
*E06B 9/02* (2006.01)
*E06B 9/00* (2006.01)

(52) U.S. Cl.
CPC .......... *E06B 9/02* (2013.01); *E06B 2009/007* (2013.01)

(58) Field of Classification Search
CPC ............................................... E06B 2009/007
See application file for complete search history.

(56) References Cited

U.S. PATENT DOCUMENTS 3,359,687 A * 12/1967 Wallace ................... F16J 15/46
                                                            49/477.1
4,040,210 A *  8/1977 Land ......................... E06B 9/24
                                                            160/90
(Continued)

FOREIGN PATENT DOCUMENTS

DE    202010005939 U1 * 11/2010 ........... E06B 9/0692
EP        0161002 A2    11/1985
(Continued)

OTHER PUBLICATIONS

International Search Report mailed May 27, 2021, in corresponding International Application No. PCT/EP2021/055485, 6 pages.
(Continued)

*Primary Examiner* — Catherine A Kelly
(74) *Attorney, Agent, or Firm* — Maier & Maier, PLLC

(57) ABSTRACT

An anti-flood device intended to seal an opening, in particular of a building, including at least one parallelepiped panel forming a chamber which can be inflated by injecting a gas, comprising two rectangular main walls joined by a lower edge, an upper edge and two lateral edges. The inner faces of the main walls of the panel are connected to each other by connecting elements formed of threads of equal length, the ends of which are respectively secured to the main walls and which ensure that they are kept parallel when the panel is inflated. The lateral and lower edges of the panel are provided, at least partially, with an elastic deformable seal which is intended to be respectively compressed against the lateral walls of the opening and the base thereof, when the panel is inflated and installed in this opening.

18 Claims, 8 Drawing Sheets

(56) References Cited

U.S. PATENT DOCUMENTS

| | | | | |
|---|---|---|---|---|
| 4,682,443 | A * | 7/1987 | Demo | E06B 9/00 |
| | | | | 49/70 |
| 5,001,866 | A * | 3/1991 | Powell | F16J 15/46 |
| | | | | 49/477.1 |
| 5,077,945 | A * | 1/1992 | Koeniger | E06B 9/00 |
| | | | | 405/114 |
| 6,312,192 | B1 * | 11/2001 | Dery | E02B 3/108 |
| | | | | 405/91 |
| 6,591,553 | B1 * | 7/2003 | Vaughn | E06B 9/02 |
| | | | | 52/202 |
| 6,672,800 | B2 * | 1/2004 | Frank | E02B 3/108 |
| | | | | 405/91 |
| 7,549,252 | B2 * | 6/2009 | Vaughn | E06B 9/02 |
| | | | | 49/465 |
| 7,849,645 | B2 * | 12/2010 | Pamboris | E06B 9/02 |
| | | | | 52/273 |
| 9,708,786 | B2 * | 7/2017 | James | E02B 3/108 |
| 9,816,310 | B2 * | 11/2017 | Haynes | E06B 1/16 |
| 10,557,239 | B1 * | 2/2020 | Malaney | E02B 3/12 |
| 10,975,539 | B2 * | 4/2021 | Parsons | E02B 3/108 |
| 2003/0102637 | A1 * | 6/2003 | Hamel | E06B 9/00 |
| | | | | 277/630 |
| 2006/0005472 | A1 * | 1/2006 | Miller | E06B 7/2303 |
| | | | | 49/498.1 |
| 2007/0271852 | A1 * | 11/2007 | Vaughn | E06B 9/02 |
| | | | | 49/466 |
| 2010/0310315 | A1 * | 12/2010 | James | E04H 9/145 |
| | | | | 405/107 |
| 2014/0109482 | A1 * | 4/2014 | Rakhmanin | E02B 7/00 |
| | | | | 49/463 |
| 2015/0036949 | A1 * | 2/2015 | Lasagna | B65D 88/16 |
| | | | | 383/14 |
| 2017/0058589 | A1 * | 3/2017 | Williams | E04H 9/145 |
| 2021/0246718 | A1 * | 8/2021 | Caputo | F16C 11/04 |
| 2022/0243414 | A1 * | 8/2022 | Junkins | E02B 3/064 |

FOREIGN PATENT DOCUMENTS

| | | | | |
|---|---|---|---|---|
| EP | 1564350 A1 * | 8/2005 | | E06B 9/02 |
| FR | 2639673 A1 | 6/1990 | | |
| FR | 2964999 A1 | 3/2012 | | |
| FR | 3007060 A1 * | 12/2014 | | E06B 7/2318 |
| GB | 2353554 A | 2/2001 | | |
| GB | 2457647 A | 8/2009 | | |
| JP | 4542421 B2 | 9/2010 | | |

OTHER PUBLICATIONS

Written Opinion of the International Searching Authority mailed May 27, 2021, in corresponding International Application No. PCT/EP2021/055485, 11 pages.

Preliminary Search Report dated Nov. 12, 2020, in corresponding French Application No. 2002225, 7 pages.

* cited by examiner

[Fig. 1]
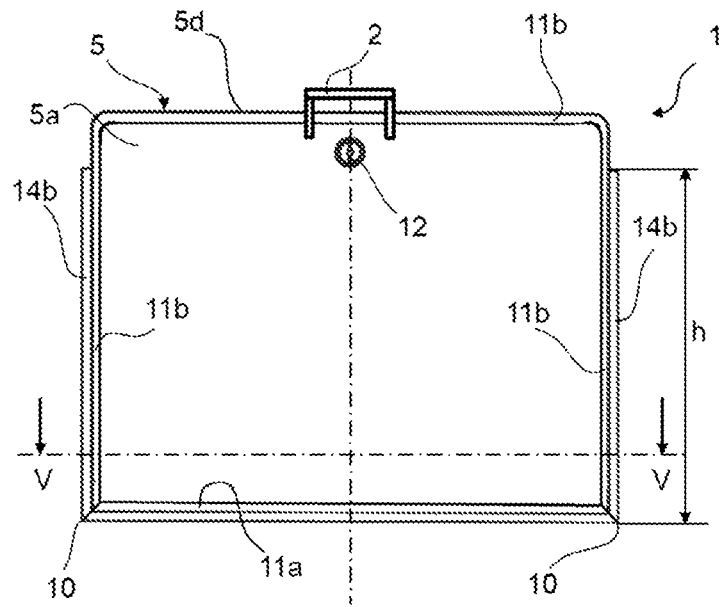
[Fig. 2]
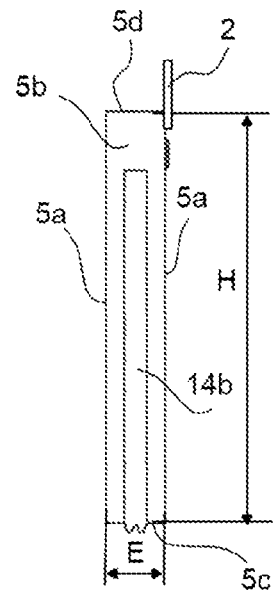

[Fig. 3]
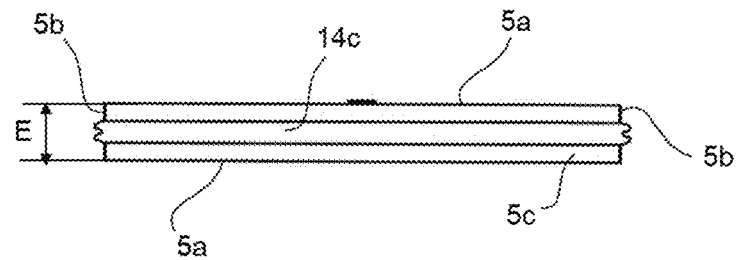
[FIG 4]
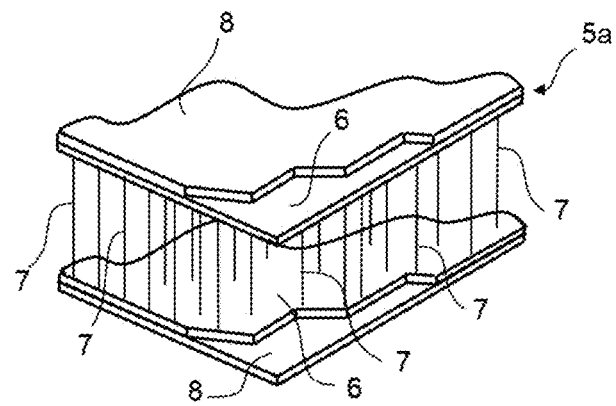
[FIG 5]
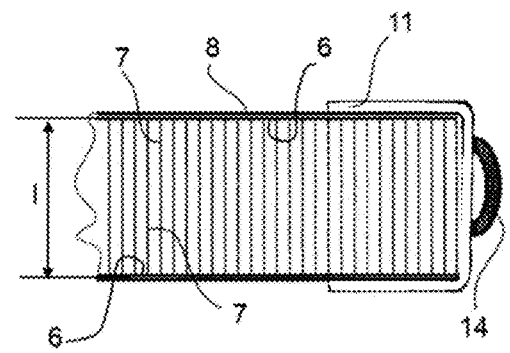

[FIG 6a]
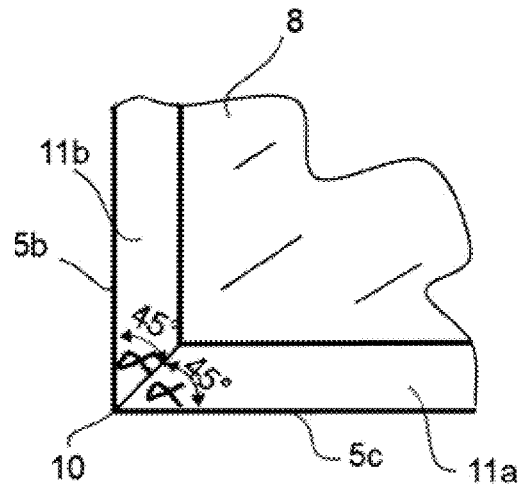
[FIG 6b]
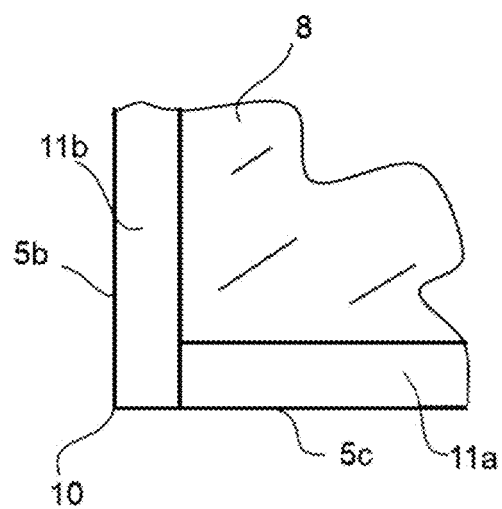

[Fig. 7a]
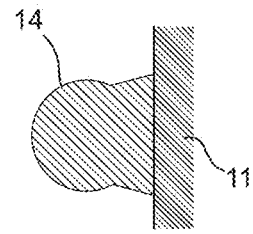
[Fig. 7b]
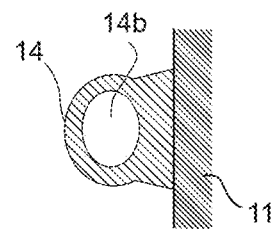
[Fig. 7c]
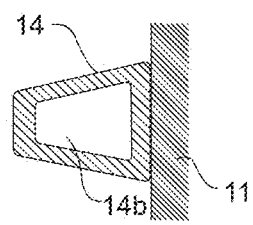
[Fig. 7d]
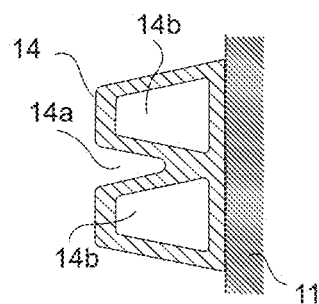

[Fig. 8]
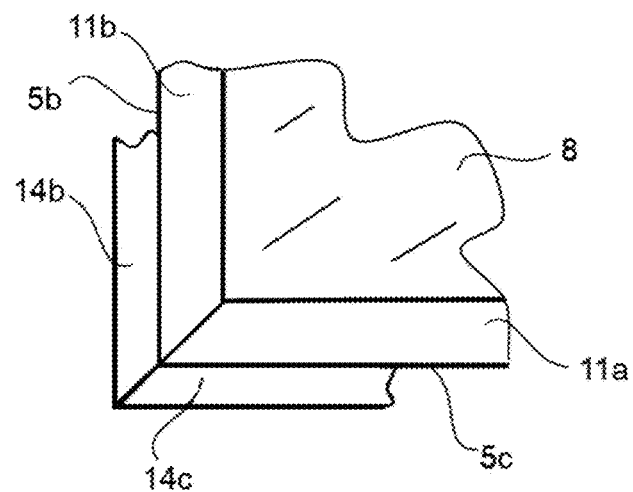
[Fig. 9]
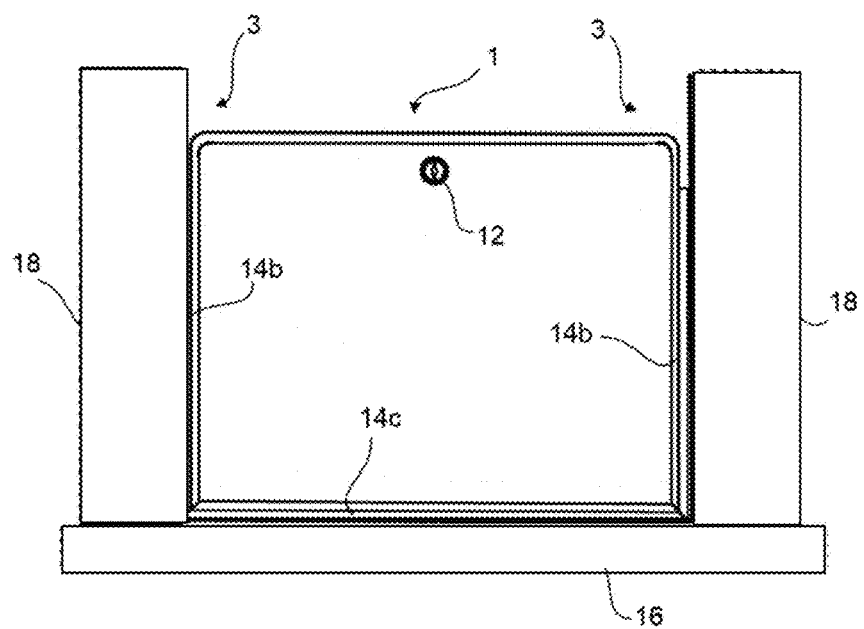

[Fig. 10]
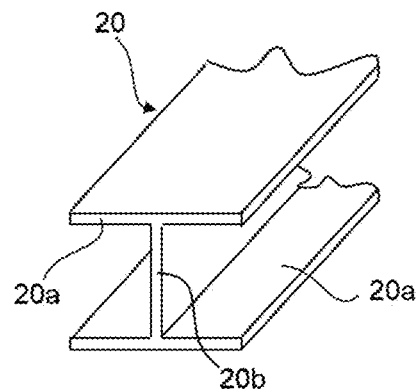
[Fig. 11]
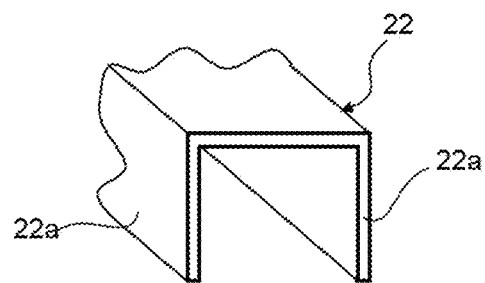
[Fig. 12]
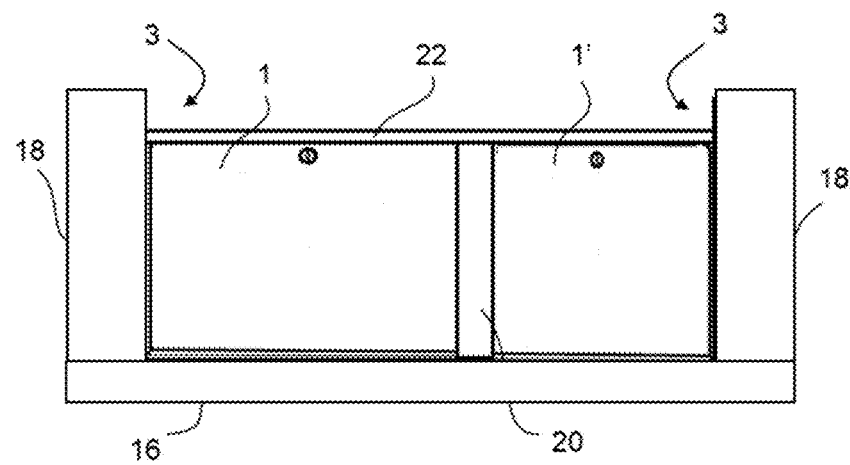

[Fig. 13]
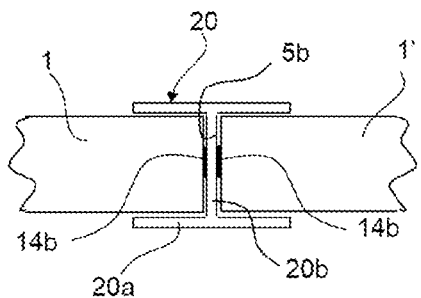
[Fig. 14]
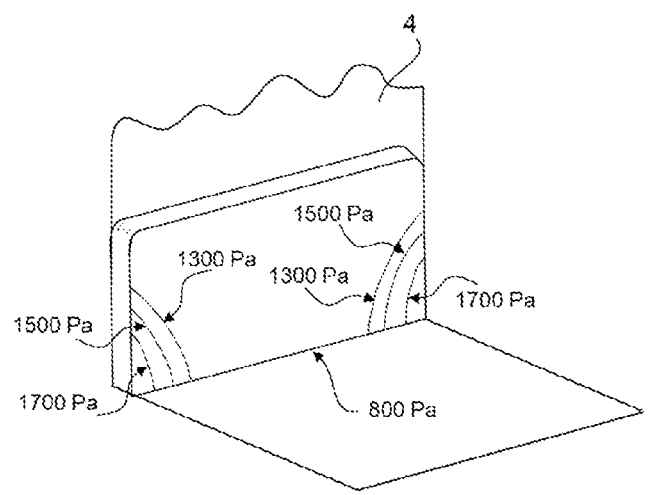
[Fig. 15]
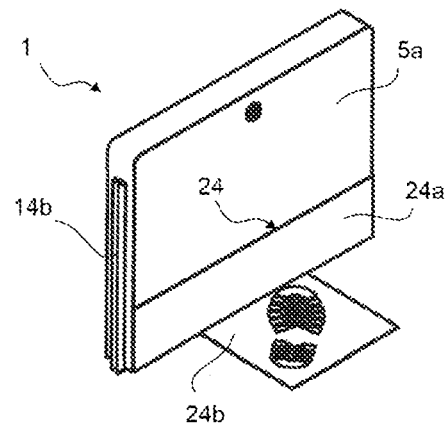

[Fig. 16a]
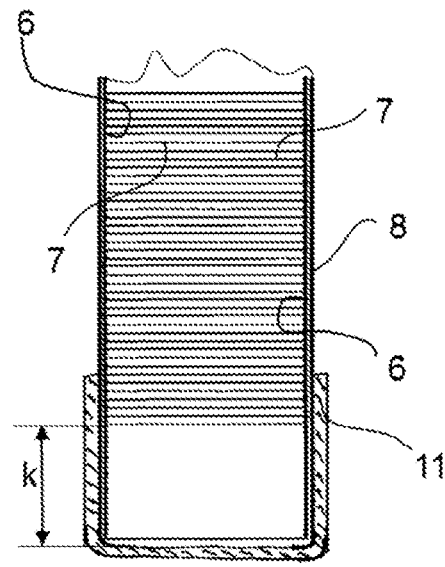
[Fig. 16b]
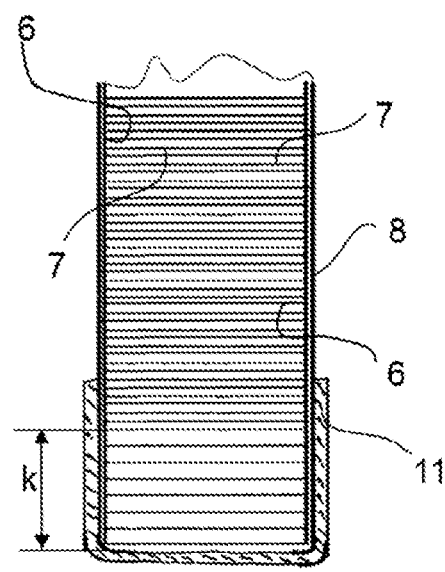

ANTI-FLOOD DEVICE

FIELD

The present invention relates to a device for preventing the intrusion of liquid flow into a building, particularly in the event of a river or watercourse overflow.

BACKGROUND

Due mainly to changing climatic conditions, river overflows have led in recent years to numerous flood situations resulting in significant damage.

To ensure the safety of homes, many devices have been proposed to close off entrances to homes.

Some of these devices are made up of rigid elements, mostly consisting of panels of wood or synthetic materials, which are cut to the size of the hole to be sealed and which have a seal on their bottom and sides made of an elastic band. Experience has shown that the installation of such panels is particularly difficult and leads to a totally ineffective result. It has been established that the force with which the elastic band is applied to the wall to be sealed is insufficient to ensure a proper seal in relation to the pressure exerted on the wall by the water.

It has also been proposed to refer to, in particular in patent FR 2.964.999, sealing systems using supporting structures ensuring the maintenance of sealing means, consisting in particular of flexible and impermeable walls such as tarpaulins which are provided at their lower part with weights attached to the tarpaulin which may consist of weights or watertight bags filled with water. In addition to the fact that such devices are particularly complex and time-consuming to implement, which means that their use should be reserved for professionals, it should be noted that their cost price is particularly prohibitive, and this for a very relative efficiency.

It has also been proposed that dams be made using watertight bags to be stacked in the openings to be sealed and which must be pre-filled by the user with sand, rubble or water. These devices are particularly cheap but are only effective in the case of simple overflow and not real floods.

European patent EP 1 564 350 proposes a system for sealing a building opening against flooding, consisting of a pressurized air-inflatable cushion of generally parallelepipedal shape set in a frame which is itself arranged on the outer part of the opening to be sealed. The front and rear inner faces of this cushion are connected by partition walls which are parallel to the lateral sides. It should be noted that this type of construction does not ensure that the cushion is held in place uniformly over its entire surface, since it is held in place only in the vertical direction, with the consequence that, as stated in the patent, the front and rear faces of the cushion take on an undulating appearance.

The anti-flood device presented in the European patent EP 0 161 002 uses a sealing mat consisting of an inflatable cushion which is provided on its periphery with means to ensure its sealing with the walls of the opening in which it is arranged. The front and rear inner walls of this inflatable mat are connected by support elements which are arranged in the horizontal and vertical directions, so that the sealing mat is in the form of a sort of matrix of balloons which, depending on their inflation, are more or less curved, so that the inflatable mat formed by this matrix of balloons does not make it possible to form a panel whose opposite surfaces are flat and whose distance from one another can be maintained constant.

The same should be applicable with Japanese patent JP 4 542 421, which describes an anti-flood barrier which consists of a series of adjacent elongated tanks which are filled with water and which are arranged so that their longitudinal axis is disposed horizontally. Each of these tanks is attached to the adjacent tank by a reinforcing wire which extends in a lateral direction perpendicular to the direction in which the tank projects.

Also known by patent FR 2 639 673 is an anti-flood device consisting of an inflatable panel made from one or more chambers forming rings which are arranged side by side so as to close off the opening to be protected. These rings are joined together by a wall with fastening elements which pass through them in gussets. Such a device, as well as the previous one, does not make it possible to constitute an inflatable panel with uniform opposite surfaces, the spacing of which can be kept constant at all points.

The purpose of the present invention is to provide an anti-flood device using a panel, which is simple in construction and therefore inexpensive, and which is also quick, easy to install and reusable. The panel of this flood control device shall be rigid, having two flat main faces maintained at a controlled spacing so as not to be deformed when inflated.

SUMMARY

The object of the present invention is thus an anti-flood device intended to seal an opening, in particular of a building, comprising at least one parallelepiped panel forming a chamber which can be inflated by injecting a gas, comprising two rectangular main walls joined by a lower edge, an upper edge and two lateral edges, characterized in that:
  the inner faces of the main walls of the panel are connected to each other, at least over part of their surface, by connecting elements consisting of holding threads of equal length, the ends of which are respectively secured to the main walls and which ensure that they are held parallel when the panel is inflated,
  the lateral and lower edges of the panel are provided, at least partially, with an elastic deformable seal which is intended to be respectively compressed against the lateral walls of the opening and the base of the opening when the panel is inflated and installed in this opening.

These holding threads may be formed from at least one bundle of elementary threads.

Preferably the tensile strength of the holding threads will be greater than the tensile force exerted on them by the main faces of the panel under inflation pressure.

The main walls of the panel may consist of a fabric to which the holding threads are attached, with at least one side of the fabric being covered externally with a watertight coating.

According to the invention, the main walls of the panel may be joined by a border made of a flexible and watertight material forming the edges of the panel.

Preferably this border will be made in two parts, namely a border part forming the lower edge of the panel and a border part forming the lateral edges and the upper edge of the panel.

In a particularly interesting embodiment of the invention, the lower corners of the panel formed by the border part constituting the lower edge with the border parts constituting the respective lateral edges thereof will be right angles.

For this purpose, the lateral section forming the lower edge of the panel and the border parts forming the lateral edges may be joined together in a "miter-cut", each forming an angle of 45° which is open on the inside.

The seal may be made in three parts, namely a lower seal element which may be fixed to the lower edge of the panel and two lateral seal elements which may be fixed to the lateral edges, these seal elements ending in a seal "miter-cut", each forming an angle equal to 45° which is open to the inside. It may be made of natural rubber or synthetic rubber, in particular ethylene propylene diene monomer (EPDM).

The cross-section of the seal may be in the form of at least one isosceles trapeze, which is fixed by its large base to the lateral and lower edges of the panel. It may also be in the form of two isosceles trapezes arranged jointly side by side, leaving a volume between their respective tops.

The internal volume of the seal may be hollowed out by a cavity.

The anti-flood device according to the invention may comprise at least two adjacently and coplanarly arranged panels which may be separated by a vertical "I"-shaped cross-sectional profile element, the adjacent lateral edges of these panels being housed between two respective flanges of this profile so that their respective lateral seal elements come into contact with the web of the profile, when the panels are inflated and in place in the opening to be sealed.

The flood protection device may comprise a U-shaped cross-sectional profile element, the flange spacing of which may be such that they can be applied against the top of the panels.

The base of the panel may receive at least one sheet of flexible material which may comprise a first part integral with a main face of the panel which is extended externally to the panel by a second part intended to be applied to the ground.

At the base and/or lateral sides of the panel, the distribution density of the holding threads may be lower than their distribution density in the rest of the panel.

The base of the panel may be free of holding threads for a height of between five and twenty centimeters. This base may be filled with liquid, especially water.

BRIEF DESCRIPTION OF THE FIGURES

As a non-limiting example, forms of execution of the present invention will be described below, with reference to the attached drawing in which:

FIG. 1 is a plan view of an embodiment of anti-flood panel according to the present invention, FIG. 2 is a left-hand view of the anti-flood panel shown in FIG. 1, FIG. 3 is a bottom view of the anti-flood panel shown in FIGS. 1 and 2, FIG. 4 is a perspective view and partial cross-section of a first implementation mode of the interior of the anti-flood panel, FIG. 5 is a partial cross-sectional view of the anti-flood panel along the V-V line in FIG. 1, FIG. 6a and FIG. 6b are partial plan views of two embodiments of a lower corner of the anti-flood panel, FIG. 7a and FIG. 7b are cross-sectional views of two alternative designs of an anti-flood panel seal, FIG. 7c and FIG. 7d are cross-sectional views of two other alternative designs of an anti-flood panel seal, FIG. 8 is a partial plan view of an embodiment of a lower corner of the anti-flood panel after a seal has been fitted, FIG. 9 is a plan view of an anti-flood panel installed in an opening to be sealed, FIG. 10 and FIG. 11 are partial perspective views of an "I" profile and a "U" profile respectively, implemented in an alternative implementation of the invention shown in FIGS. 12 and 13, FIG. 12 is a plan view of an implementation method combining two anti-flood panels, FIG. 13 is a partial top view of the device shown in FIG. 12, FIG. 14 is a view of the pressure profile exerted on a 1 m high panel according to the invention by a frontal water flow moving at a speed of 1 m/s, FIG. 15 is a schematic perspective view of an alternative embodiment designed to facilitate the installation of a panel.

FIG. 16a and FIG. 16b are partial transverse views of two variants of the base of a panel according to the invention.

DETAILED DESCRIPTION

FIGS. 1 to 5 show an anti-flood device according to the invention, which essentially consists of an inflatable panel 1 which is intended to be placed in an opening 3 of a building in order to close it off. In order to facilitate the positioning of this panel, it can be provided, as shown in FIG. 1, with a handle 2.

More precisely, this inflatable panel is made up of an envelope 5 comprising two opposite rectangular main walls 5a which are joined by two lateral edges 5b, a lower edge 5c and an upper edge 5d.

As shown in FIGS. 4 and 5, the two main walls 5a of the panel 1 are made of a fabric 6, the inner surfaces of which are joined together by a multitude of strong holding threads 7 of equal length I, which define the thickness E of the panel 1 when inflated, as explained below.

In one embodiment of the invention, each of the holding threads 7 is formed by a bundle of elementary fibers which are associated at their ends, i.e. where these fibers are fixed to the fabric 6.

As shown in FIG. 4, this fabric 6 is covered, at least on its side constituting the external face of the panel, with a watertight coating 8, consisting for example of polyurethane, polyvinyl chloride (PVC), or an impermeable rubber, which is fixed to the fabric 6 for example by gluing, heat-bonding, or by welding means, in particular high frequency welding means.

The two main walls 5a of the panel 1 are joined around their entire periphery by a border 11 made of a flexible and watertight material, such as polyurethane, which thus forms the edges of the panel, namely the lateral edges 5b and the lower and upper edges 5c and 5d. This border will be fixed, for example, by gluing, by heat-bonding or, as previously, by high frequency welding.

According to a mode of implementation of the invention, it will be ensured, during the installation of this border, that the corners 10 formed by each lateral edge 5b with the lower edge 5c, and referred to hereinafter as "base corners" of the panel, are made as close as possible to a value of 90°.

Such an arrangement makes it possible to greatly improve the sealing qualities of the panel according to the invention compared to the inflatable panels of the prior art. Indeed, a study carried out by the applicant has established that the water pressure exerted on a panel is at its maximum in the lower corners of the panel.

More precisely, the pressure profile, shown in FIG. 14, was recorded for a panel resting on a plane 4 by a frontal water flow the level of which is 1 meter and which moves at a speed of 1 m/s. A pressure of approximately 1700 Pa was thus recorded in the lower corners 10 of the panel, for a pressure at the center of the base of the panel of 800 Pa. Under these conditions, it is understood that the panel according to the invention will be all the more effective as it will be able to contain the water in its base corners 10.

This is done by ensuring that these panel corners are as close as possible to 90° and, as explained below, by intervening on the one hand at the lower edge of the panel itself and on the other hand at the level of the seal which will be placed on it as explained below.

The border 11, which is arranged on the periphery of the main walls 5a, forms a closed chamber with the latter. In order to achieve 90° base angles of corners 10, this border is made up of two separate elements, namely a first border 11a which forms the lower edge 5c and a second border 11b which forms both the two lateral edges 5b and the upper edge 5d. These borders, as shown in FIG. 6a, end in a "miter-cut", i.e. forming an angle $\alpha$ equal to 45° which is open on the inside.

They may also end, as shown in FIG. 6b, in two straight cuts that meet at the corners 10.

Such a method of implementation is particularly interesting in that it ensures an effective seal at the lower corners 10 of the panel between the latter and, on the one hand, the floor 16 and, on the other hand, the lateral walls 18 of the opening 3 which it is desired to conceal, as explained below.

The result is a sealed chamber that can be inflated and deflated as required. To this end, one of the main walls 5a of the panel is provided with a valve 12 which is preferably arranged in the upper part of the panel.

The lateral edges 5b and the lower edge 5c of the panel 1 are provided with a seal 14 which is intended to seal the panel 1 with the lateral walls 18, such as the walls of the building to be preserved, and the floor 16 of the building.

This seal is made of a strip of a deformable and elastic material such as natural rubber or synthetic rubber, in particular ethylene-propylene-diene monomer, generally known by the acronym "EPDM". Such an elastomer will preferably be chosen with a shore A hardness of between 40 and 80 and with an elastic resistance at break of between 13 MPa and 25 MPa.

This seal is fixed, for example, by gluing to the lateral edges 5b on the one hand and to the lower edge 5c of the panel 1 on the other. The height h of the seal on the lateral edges 5c defines the maximum height of the water level to be protected. This height h can be equal to or less than the height H of the panel 1, depending on needs.

This seal 14 can be formed by a solid seal as shown in FIG. 7a or by a seal provided with a cavity 14x as shown in FIG. 7b, the hollow seal allowing the designer to have for the same basic material and according to the needs and conformity of the surface state of the floor and the lateral walls of the opening, an improved deformation capacity.

This seal may have a rounded cross-section as shown in FIGS. 7a and 7b, or an isosceles trapeze shape as shown in FIGS. 7c and 7d, with the large base fixed to an edge of the panel.

Furthermore, the cross-section of this seal may be formed, as shown in FIG. 7d, by two isosceles trapezes arranged side by side, leaving a volume 14a between their respective tops, intended to form a suction effect when the seal is pressed against a surface to be sealed, as explained below.

The latter form of implementation has proved particularly interesting in that its effectiveness is greatly improved due to a suction phenomenon that occurs when this seal, after having been strongly compressed against a wall, is subjected to a shrinkage force.

In order to maintain the integrity of the 90° corners at the base of the panel, the seal 14 may be cut into three elements, namely a lower seal element 14c attached to the lower edge 5c and two lateral seal elements 14b attached to the lateral edges 5b respectively. These seal elements will be assembled in a "miter-cut" and, for this purpose, the ends of the lower seal element 14c will be cut at 45° as well as the lower ends of the lateral seals 14b, as shown in FIG. 8.

When not inflated, the panel can be rolled up or folded, giving it a particularly small storage volume, which is particularly interesting for transport.

The anti-flood panel can be put into operation in a simple manner without the need for any civil engineering operation. To do this, the panel is placed in the opening 3 that it is desired to seal, for example a door as shown in FIG. 9, with the lower seal element 14c in contact with the floor 16 and the two lateral seals 14b in contact with the lateral walls 18 of the opening 3. The panel is then inflated by connecting the valve 12 to blowing means, such as a simple hand pump, capable of injecting into the panel a pressurized gas, and in particular air, so as to bring the internal volume of the panel to a pressure of, in particular, between $10^5$ Pa and $1.5.10^5$ Pa.

The pressure increases the width and height of the panel and the lateral and lower seals are pressed tightly against the frames of the opening to be sealed. Furthermore, under the effect of the pressure, the opposite main walls 5a ensure the tension of the threads 7 and the panel then takes on the thickness determined by the length I of the latter, the two main walls 5a remaining parallel to each other which avoids any deformation of the panel in the direction of the thickness.

Such an arrangement thus makes it possible to inflate the panel 1 with a gas under significant pressure and to stiffen it without it being subjected to a deformation which would make its main faces 5a curved, as is the case in inflatable panels according to the prior art. Holding the main faces 5a by the threads 7 in this way makes it possible to give the panel a high degree of rigidity, a rigidity which results in better compression of the seals 14 and therefore better adaptability of the latter to the surface conditions against which they are applied, which results in a better sealing of the device.

According to the invention, it is possible to combine several panels, which may or may not have the same dimensions, when the width of the opening to be closed is large, for example in the case of an opening formed by a garage door.

FIG. 12 shows the combination of two panels 1, 1', but the invention could of course call for the combination of a larger number of panels.

To do this, the two panels 1 and 1' are placed in line with each other in a coplanar manner across the opening 3 and a section, preferably a metal section 20, is inserted vertically between these two panels, the cross-section of which is I-shaped, as shown in FIG. 10. The adjacent lateral edges 5b of these two panels 1 and 1' are respectively inserted between two flanges 20a of the profile 20 so that, as shown in FIG. 13, their lateral seals 14b are pressed, when the panels are inflated, against the web 20b of the profile.

In order to ensure that these two panels 1, 1' are held together properly, their upper part is covered with a section 22 with a "U" shaped cross section, shown in FIG. 11, the distance between the wings 22a of which is such that the latter are applied against the upper part of the panels.

In a mode of implementation of the invention which is represented in FIG. 15, a sheet of flexible material 24 is arranged at the base of one of the main faces 5a, preferably the inner face, i.e. on the face opposite that subjected to the action of the water, which comprises a first part 24a which is attached to the main face 5a and which is extended externally to the panel by a second part 24b, which may be of lesser width, and which is intended to be applied to the ground 16.

This arrangement is intended to make it easier for the user to position the panel correctly. To this end, the user places a foot on part 24b, which will have the effect of pressing the lower seal 14c on the lower edge 5c of the panel against the floor 16, where it can be easily held while the panel is being inflated.

The panels can be made in any size, whether standard or not. Preferably the height will be 1 m, as it is strongly recommended not to exceed this value for safety reasons related to the structure of the buildings to be protected.

The present invention enables the designer to easily produce panels of the width desired by the users. He will also be able to produce panels whose width will be close to the standard values of the openings most often concerned, such as building doors in particular, while allowing him to provide a range of widths that differ from one another by the value of a step which will be, for example, close to the value of the increase in width of the panel during the inflation operation and which, statistically, is of the order of 7 cm.

This will allow the user, provided he has several models, to scan very different widths since, as shown in FIG. 12, he can add and combine panels of different widths.

The present invention is particularly interesting in that:
The flood protection device is of the foldable type after the intervention, which allows the user to store it easily,
it does not require any civil engineering work for its operation,
the panel does not deform during inflation, which gives it excellent rigidity, allowing it to apply pressures to the seal it is fitted with that ensure an effective seal,
the specific shape of the panel allows it to achieve a good seal in the corners at its base,
it allows several panels to be combined, especially of different sizes.

In an interesting mode of implementation of the present invention, represented schematically in FIG. 16a, it may be interesting not to arrange the holding threads 7 over the entire volume of the panel in order to reserve, at the base of the latter, a zone of a height k without holding threads 7, for example of the order of about ten centimeters. This zone of height k is thus given less rigidity. Such an arrangement allows the base of the panel to be more flexible, which enables it to deform more easily in order to adapt to any irregularities in the ground on which it rests, thus improving the contact seal.

This form of implementation is interesting in that it allows a volume of liquid, in particular water, to be introduced into the internal volume of the panel freed by the absence of the holding threads. The weight of the water and the pressure of the inflating air which are applied to this volume of water have the effect of forcing the base of the panel against the ground, and the gain in watertightness thus obtained is all the more effective as the base of the panel has been made more flexible by the removal of the holding threads in this area.

According to the invention, it is also possible to play on the distribution density of the holding threads, i.e. on the number of threads used on the same surface of the main faces 5a of the panel. It is thus possible, as shown in FIG. 16b, to make the base of the panel, over a height k, with a distribution density of the holding threads 7 that is lower than that of the rest of the panel, which makes it possible to give the base of the latter a flexibility that is just sufficient to ensure good deformability according to the state of the surface of the ground on which it is intended to rest and the rigidity that it is desired to maintain for this zone.

The same could of course be done for one or both lateral vertical sides of the panel.

It would also be possible to achieve a distribution density that would be progressive.

The present invention thus allows the user to control the deformability and stiffness parameters of the base and/or lateral sides of the panel.

Of course, if the present device can be used to prevent the entry of a liquid into a chamber, it can also be used to prevent its exit.

The invention claimed is:

1. An anti-flood device intended to seal an opening, comprising at least one parallelepiped panel forming a chamber which can be inflated by injecting a gas, comprising two rectangular main walls joined by a lower edge, an upper edge and two lateral edges, wherein:
    inner faces of the main walls of the panel are connected to each other, at least partially, by connecting elements consisting of holding threads of equal length, ends of the holding threads are secured respectively to the main walls and which ensure that the main walls are kept parallel when the panel is inflated, and
    the lateral and lower edges of the panel are provided, at least partially, with an elastic deformable seal which is intended to be compressed respectively against lateral walls of the opening and a base thereof, when the panel is inflated and installed in that opening,
    wherein a base of the panel comprises a distribution density of the holding threads that is lower than that of the rest of the panel or wherein the base does not comprise holding threads over a height of between five and twenty centimeters.

2. The anti-flood device according to claim 1, wherein the holding threads are formed by at least one bundle of elementary threads.

3. The anti-flood device according to claim 1, wherein the tensile strength of the holding threads is greater than the tensile force exerted on them by the main faces under the effect of the inflation pressure.

4. The anti-flood device according to claim 1, wherein the main walls of the panel consist of a cloth to which the holding threads are fixed, at least one face of this the cloth being covered externally with a watertight coating.

5. The anti-flood device according to claim 1, wherein the main walls of the panel are joined by a border made of a flexible and watertight material forming the edges thereof.

6. The anti-flood device according to claim 5, wherein the border is made in two parts, namely a border part forming the lower edge of the panel and a border part forming the lateral edges and the upper edge thereof.

7. The anti-flood device according to claim 6, wherein lower corners of the panel formed by the border part forming the lower edge with the border parts respectively forming the lateral edges thereof are right angles.

8. The anti-flood device according to claim 7, wherein the border part forming the lower edge of the panel and the border parts forming the lateral edges terminate contiguously in a "miter-cut", each forming an angle equal to 45° which is open to the inside.

9. The anti-flood device according to claim 1, wherein the seal is made in three parts, namely a lower seal element which is fixed to the lower edge of the panel and two lateral seal elements which are fixed to the lateral edges, these seal elements terminating in a "miter-cut", each forming an angle equal to 45°.

10. The anti-flood device according to claim 1, wherein the seal is made of natural rubber or synthetic rubber.

11. The anti-flood device according to claim 1, wherein the seal has a cross-section in a shape of at least one isosceles trapezium trapezoid which is fixed by the base to the lateral and lower edges of the panel.

12. The anti-flood device according to claim 11, wherein the cross-section of the seal is formed by two isosceles trapezoids arranged jointly side by side, leaving a volume between the respective tops.

13. The anti-flood device according to claim 1, wherein the seal has an internal volume that is hollowed out by a cavity.

14. The anti-flood device according to claim 1, wherein the anti-flood device comprises at least two panels arranged adjacently and coplanarly which are separated by a vertical profiled element with an "I"-shaped cross-section, the adjacent lateral edges of these panels being housed between two respective flanges of the profiled element so that respective lateral seal elements of the edges are applied against the web of said profiled element, when the panels are inflated and in place in the opening to be sealed.

15. The anti-flood device according to claim 14, wherein the anti-flood device comprises a profiled element with a "U"-shaped cross-section having two profile wings, the spacing of the wings is such that the wings are applied against the upper part of the panels.

16. The anti-flood device according to claim 1, wherein the base of the panel receives at least one sheet of flexible material which comprises a first part integral with a main face of the panel which is extended externally to the latter by a second part intended to be applied to the ground.

17. The anti-flood device according to claim 1, wherein, at the base and/or on the lateral sides of the panel, the distribution density of the holding threads is lower than their distribution density in the rest of the panel.

18. The anti-flood device according to claim 1, wherein the said base of the panel is filled with liquid.

* * * * *